(12) United States Patent
Uehara et al.

(10) Patent No.: US 6,482,093 B1
(45) Date of Patent: Nov. 19, 2002

(54) DAMPER DISK ASSEMBLY

(75) Inventors: Hiroshi Uehara, Hirakata (JP); Yasuyuki Hashimoto, Neyagawa (JP)

(73) Assignee: Exedy Corporation, Neyagawa (JP)

( * ) Notice: Subject to any disclaimer, the term of this patent is extended or adjusted under 35 U.S.C. 154(b) by 0 days.

(21) Appl. No.: 09/711,904

(22) Filed: Nov. 15, 2000

(30) Foreign Application Priority Data

Nov. 30, 1999 (JP) ............................................ 11-339415

(51) Int. Cl.$^7$ ................................................. F16D 3/66
(52) U.S. Cl. ........................................ 464/68; 192/205
(58) Field of Search ........................... 464/68; 192/203, 192/205; 267/169, 178, 179

(56) References Cited

U.S. PATENT DOCUMENTS

| | | | | |
|---|---|---|---|---|
| 4,663,983 A | * | 5/1987 | Kobayashi et al. | 192/205 X |
| 4,969,855 A | * | 11/1990 | Graton et al. | 192/205 X |
| 5,038,906 A | * | 8/1991 | Minbu | 192/205 |
| 5,609,526 A | * | 3/1997 | Kitayama et al. | 464/68 |
| 5,800,270 A | * | 9/1998 | Uenohara et al. | 192/205 X |
| 5,823,516 A | * | 10/1998 | Despres | 192/203 X |
| 6,332,843 B1 | * | 12/2001 | Hashimoto | 464/68 |

FOREIGN PATENT DOCUMENTS

| | | |
|---|---|---|
| DE | 3049645 A1 | 6/1983 |
| DE | 3429725 A1 | 7/1985 |
| DE | 19611505 A1 | 10/1996 |
| FR | 2758863 A1 | 7/1998 |

* cited by examiner

Primary Examiner—Greg Binda
(74) Attorney, Agent, or Firm—Shinjyu Global IP Counselors, LLP (57) ABSTRACT

A damper disk assembly is provided for use in a clutch device that suppresses wearing and breakage of a spring seat during operation of a clutch. The damper disk assembly has a pair of plates 5 and 6 elastically coupled to the hub flange 8 by a damper mechanism 4. The damper mechanism 4 includes a plurality of coil spring assemblies 13 having a large coil spring 30, a small coil spring 31 and a pair of spring seats 64. The paired spring seats 64 are arranged on the circumferentially opposite ends of the small coil spring 31. The hub flange 8 is a plate member provided with spring accommodating openings 21. The clutch and retaining plates 5 and 6 are fixed together such that they are axially spaced by a predetermined distance with the flange 8 disposed therebetween. The clutch and retaining plates 5 and 6 are provided with spring accommodating portions 11 in positions corresponding to the openings 21. The small coil springs 31 are disposed within the openings 21 and portions 11 for transmitting a torque between the flange 8 and the plates 5 and 6. The spring seats 64 have support portions 65 that support the circumferentially opposite ends of the spring 31. The support portions 65 of the spring seats 64 are supported by the circumferentially opposite ends of the opening 21 and the portion 11. The portion 11 is provided at its circumferentially opposite ends with spring seat receiving portions 32 extended axially, and having an axial length larger than the axial thickness of each of the plates and 6 for contact with the support portion 65 of the spring seat 64.

21 Claims, 4 Drawing Sheets

DAMPER DISK ASSEMBLY

BACKGROUND OF THE INVENTION

1. Field of the Invention

This invention generally relates to a damper disk assembly. More specifically, the present invention relates to a damper disk assembly for dampening torsional vibrations in a power transmission system.

2. Background Information

A damper disk assembly is often used in a clutch disk assembly of an automobile. The damper disk assembly is formed of an input member, an output member and a damper mechanism. The input member can be coupled to a flywheel. The output member can be coupled to a shaft extending from a transmission. The damper mechanism elastically couples the input and output members together in a rotating direction. The input member is typically formed of a pair of friction facings and a pair of input plates, which are arranged radially inside the friction facings. The friction facings are fixedly coupled to one of the input plates. The output member is typically in the form of a hub that is non-rotatably coupled to the shaft of the transmission. The hub has a centrally located boss with a splined bore, and a radial flange extending outwardly from the boss. The splined bore of the boss is spline-engaged with the shaft of the transmission. The radial flange extends from the boss and is elastically coupled to the input plates by the damper mechanism. The damper mechanism is formed of springs that elastically couple the pair of input plates to the flange of the hub in the rotating direction, and a friction generating mechanism for generating friction between the pair of input plates and the flange.

The flange of the hub is provided with windows (spring accommodating apertures) for receiving the springs therein. The paired input plates are provided with spring support portions (spring accommodating portions) for supporting the springs. Each window supports the circumferentially opposite ends and radially opposite ends of the spring. The spring support portions support the circumferentially opposite ends, radially opposite ends and axially opposite ends of the spring. When the input plate pair rotates relatively to the flange, each spring is compressed between one end surface on one circumferential side of the window and one end surface on the other circumferential side of the spring support portions. In this compressing operation, each of the end surfaces on circumferential opposite sides of the window and the spring support portions move such that the radially outer portions of these surfaces move a distance that is circumferentially longer than the radially inner portions of these surfaces. Therefore, each spring has such a form that the radially outer portion (i.e., the outer portion in the radial direction of the disk) has a circumferential length or width shorter than that of the radially inner portion. When the spring is compressed in a nonparallel fashion as described above, the spring is subjected to a bending force in addition to a shearing force, resulting in a reduced lifetime. When the pair of input plates rotates relatively to the hub, the springs are compressed in the rotating direction so that sliding occurs in the friction generating mechanism. As a result, torsional vibrations in the rotating direction are absorbed and dampened.

According to this clutch disk assembly, when the friction facing is pressed against the flywheel to engage the clutch, a torque is supplied from a flywheel to the input plate pair via the friction facing. The torque is transmitted via the springs to the hub, and then is transmitted to the shaft extending from the transmission. When torsional vibrations occur in the clutch disk assembly, the springs are compressed in the rotating direction, and the input plate pair rotates relatively to the hub. Thereby, sliding occurs in the friction generating mechanism. As a result, the torsional vibrations in the rotating direction are dampened.

In this clutch disk assembly, the flange of the hub is provided with spring accommodating openings for accommodating the springs, and the paired input plates are provided with spring accommodating portions for holding the springs. The spring accommodating opening supports the circumferentially opposite ends and radially opposite ends of the spring, and the spring accommodating portion supports the circumferentially opposite ends, radially opposite ends and axially opposite ends of the spring. A pair of spring seats are arranged on the circumferentially opposite ends of the spring for parallel compression of the spring.

The spring seat has a support portion which extends axially for supporting one of the circumferentially opposite ends of the coil spring, and a projection which extended circumferentially toward the spring from the support portion, and is located within the spring.

Since the spring accommodating portions in the pair of input plates are formed by stamping, the spring seat is supported by stamped edges of the input plates. According to this structure, the spring seat is in contact with the support portions of the paired input plates through a small area so that a surface pressure between them is large, and therefore wearing of the spring seat is liable to occur.

In view of the above, there exists a need for a damper disk assembly which overcomes the above mentioned problems in the prior art. This invention addresses this need in the prior art as well as other needs, which will become apparent to those skilled in the art from this disclosure.

SUMMARY OF THE INVENTION

An object of the invention is to provide a damper disk assembly that suppresses wearing and breakage of the spring seat in the clutch operation.

A damper disk assembly according to a first aspect of the present invention includes a first rotary member, a pair of second rotary members, a spring member and a pair of spring seats.

The first rotary member is a plate member provided with a spring accommodating opening. The paired second rotary members are disposed on the axially opposite sides of the first rotary member, are fixed together with a predetermined axial space therebetween, and are provided with spring accommodating portions located in the position corresponding to the spring accommodating opening. The spring member is disposed in the spring accommodating opening and the spring accommodating portions for transmitting a torque between the first rotary member and the second rotary member pair. The paired spring seats have support portions extending in the axial direction, supporting the circumferentially opposite ends of the spring member, and being supported by the circumferentially opposite ends of the spring accommodating opening and the spring accommodating portions. The spring accommodating portion is provided at each of its circumferentially opposite ends with a first surface extending in the axial direction, and having an axial length longer than the axial thickness of the second rotary member for contact with the support portion of the spring seat.

In this damper disk assembly, when the torque is supplied to the second rotary member pair, the torque is transmitted to the first rotary member via the spring seat pair and the spring member. When torsional vibrations occur to cause relative rotation between the second rotary member pair and the first rotary member, the spring member is compressed in the rotating direction. In this operation, one of the paired spring seats is pressed to the edge of the spring accommodating opening in the first rotary member, and the other is pressed to the spring support portion of the second rotary member so that the paired spring seats move toward each other.

In this structure, since the spring support portion can be in contact with the support portion of the spring seat through the first surface having a larger area than a contact area in the prior art, the surface pressure applied from the second rotary member pair to the spring seat can be small. Therefore, it is possible to suppress wearing and breakage of the spring seats during rotation of the clutch disk assembly.

According to a second aspect of the present invention, the damper disk assembly of the first aspect of the present invention further has such a feature that the spring accommodating portion is provided at its circumferentially opposite ends with second surfaces for restricting axial movement of the spring seats, respectively.

In this damper disk assembly, the second surfaces of the spring accommodating portion restrict the axial movement of the support portions of the spring seats. Therefore, it is possible to prevent rattling of the spring seats during rotation of the damper disk assembly.

According to a third aspect of the present invention, a damper disk assembly includes a first rotary member, a pair of second rotary members, a spring member and a pair of spring seats. The first rotary member is a plate member provided with a spring accommodating opening. The paired second rotary members are disposed on the axially opposite sides of the first rotary member, are fixed together with a predetermined axial space therebetween, and are provided with spring accommodating portions located in the position corresponding to the spring accommodating opening. The spring member is disposed in the spring accommodating opening and the spring accommodating portions for transmitting a torque between the first rotary member and the second rotary member pair. The paired spring seats have support portions extending in the axial direction, supporting the circumferentially opposite ends of the spring member, and being supported by the circumferentially opposite ends of the spring accommodating opening and the spring accommodating portions. The spring accommodating portion is provided at each of its circumferentially opposite ends with a first wall shaped by drawing into an axially extending form, and supporting a circumferentially outer side and radially opposite sides of the support portion of the spring seat.

In this aspect of the present invention, since the first wall can be in contact with the support portion of the spring seat through a larger area than the conventional structure, a surface pressure applied from the second rotary member pair to the spring seat is small. Therefore, it is possible to prevent wearing and breakage of the spring seat during rotation of the clutch disk assembly.

According to a fourth aspect of the present invention, the damper disk of the third aspect of the present invention further has such a feature that the spring accommodating portion is provided at its circumferentially opposite ends with second walls each formed axially outside the first wall for supporting the axially outer side of the support portion of the spring seat.

In this damper disk assembly, since the second wall restricts the axial movement of the support portion of the spring seat, rattling of the spring seat can be suppressed during rotation of the damper disk assembly.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
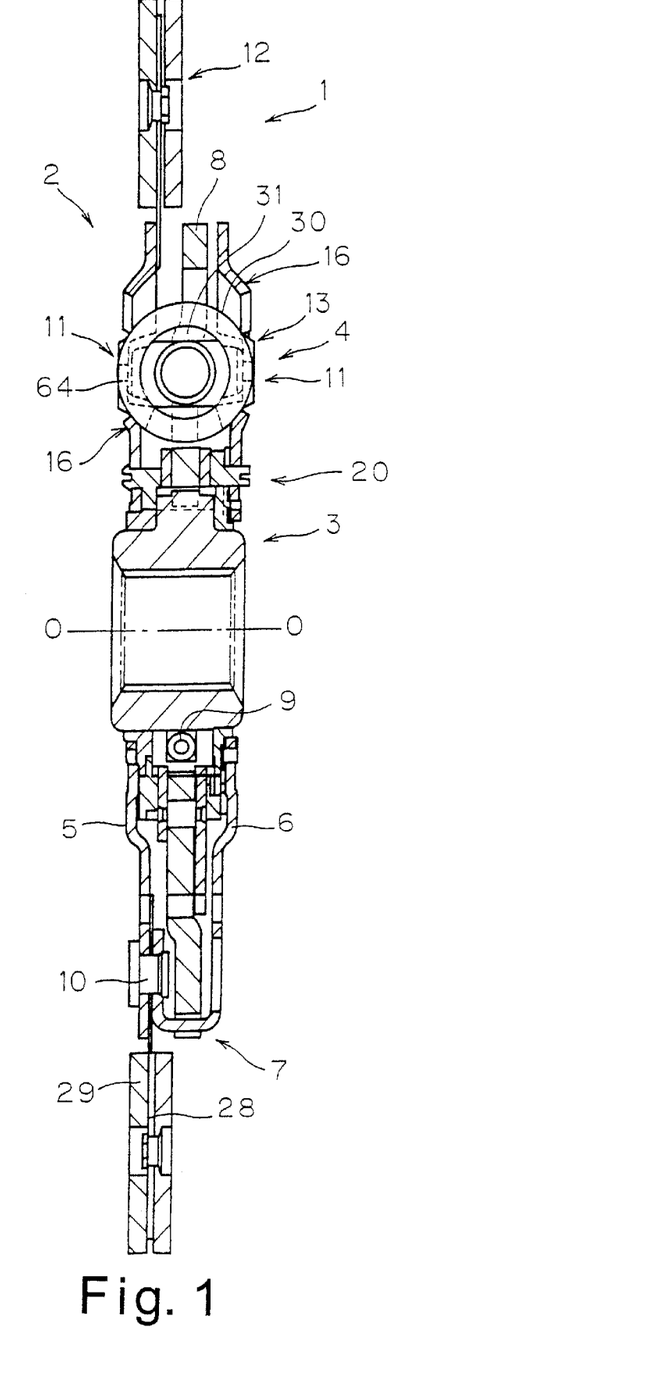
FIG. 1 is a schematic cross sectional view of a clutch disk assembly taken along line I—I in FIG. 2 and employing spring seats in accordance with a first embodiment of the present invention.
Figure 2:
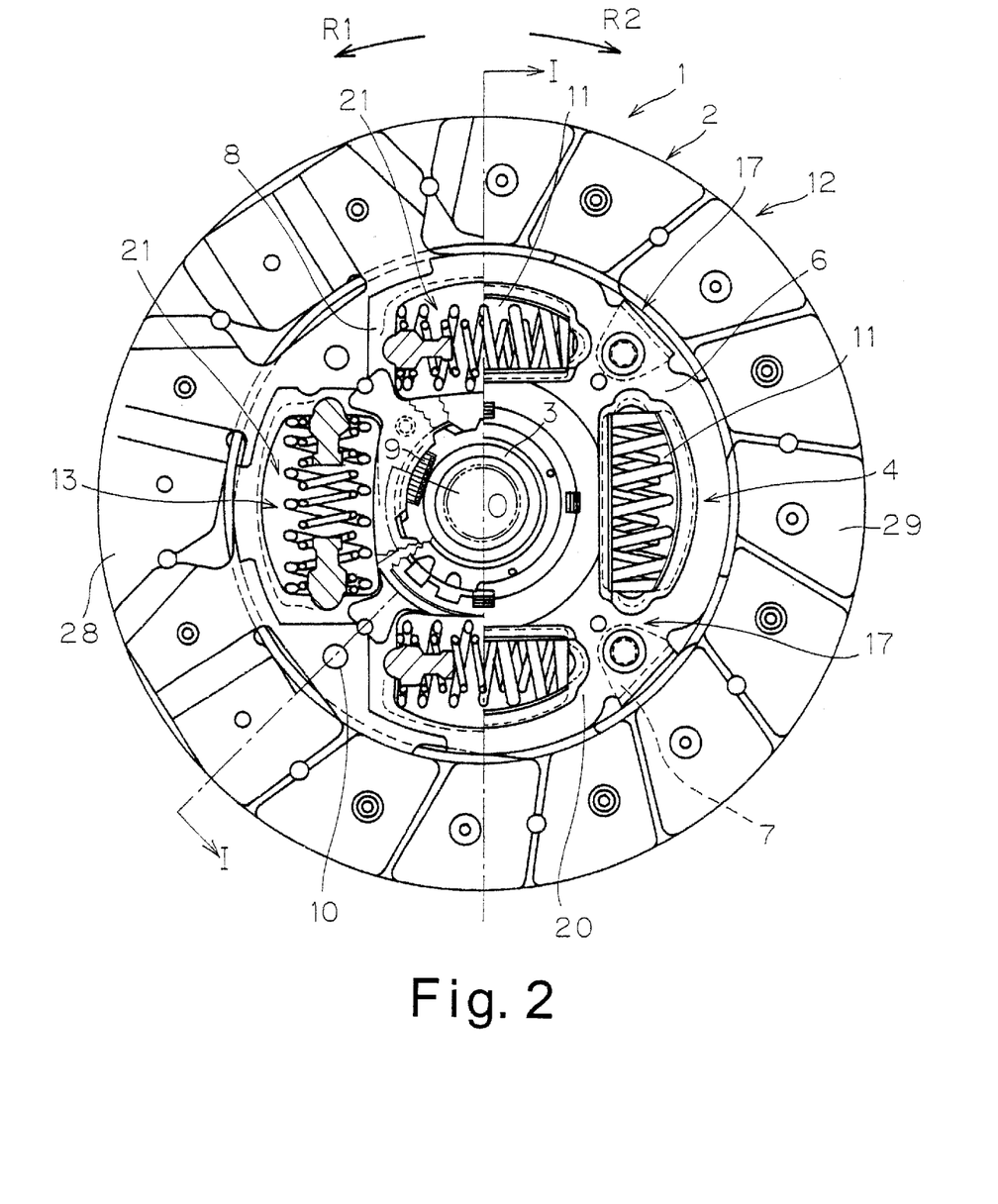
FIG. 2 is an elevational view of the clutch disk assembly shown in FIG. 1, with certain portions broken away to illustrate the spring seats of the present invention.

Referring initially to FIGS. 1 and 2, a clutch disk assembly 1 employing a damper disk assembly in accordance with one embodiment of the invention. FIG. 1 is a cross section of the clutch disk assembly taken along line I—I in FIG. 2. FIG. 2 is an elevational view of the clutch disk assembly 1. The clutch disk assembly 1 is a power transmission device used in a clutch device of an automobile, and has a clutch function and a damper function.

In FIG. 1, the central axis or centerline O—O indicates a rotation axis of the clutch disk assembly 1. In FIG. 1, an engine and a flywheel (both not shown) are disposed on the left side of the clutch disk assembly 1, and a transmission (not shown) is disposed on the right side. In FIG. 2, an arrow $R_1$ indicates a drive side (positive side) in the rotating direction of the clutch disk assembly 1, and an arrow $R_2$ indicates a reverse side (negative side).

The clutch disk assembly 1 is primarily formed of an input rotary member 2, an output rotary member 20 and a damper mechanism 4 arranged between input and output rotary members 2 and 20. The input rotary member 2 is primarily formed of a clutch plate 5 and a retaining plate 6 (i.e., a pair of second rotary members) and a clutch disk 12. The output rotary member 20 is primarily formed of the spline hub 3 and the hub flange 8. The clutch function is performed by the input rotary member 2 which is selectively transmitting and intercepting a torque by engaging or disengaging a flywheel (not shown). The damper mechanism 4 performs the function of absorbing and dampening torque vibrations transmitted from the flywheel side via springs. The output rotary member 20 is provided for transmitting a torque from the input rotary member 2 to the transmission.

The clutch plate 5 and the retaining plate 6 are made of steel or metal plates, which are arranged on the engine side and the transmission side, respectively, of the hub flange 8. The metal material forming the clutch plate 5 has a thickness $T_1$ in a transverse direction. The metal material forming the retaining plate 6 has a thickness $T_2$ in a transverse direction. Preferably, $T_1$ is substantially equal to $T_2$. The clutch and retaining plates 5 and 6 are axially spaced by a predetermined distance from each other. The clutch and retaining plates 5 and 6 are fixedly coupled together by platelike coupling portions 7. Thereby, the axial distance between the plates 5 and 6 is fixed, and the plates 5 and 6 rotate together with each other. The clutch and retaining plates 5 and 6 are provided at their radially inner portions with central apertures, respectively, in which a spline hub 3 is arranged as will be described later. Each of the clutch and retaining plates 5 and 6 is provided at its radially middle portion with a plurality (four) of spring support or accommodating portions 11, which are equally spaced from each other for supporting coil spring assemblies 13 forming the damper mechanism 4, as will be described later.

The clutch disk 12 is configured to be pressed against the friction surface of the flywheel for transmitting a torque of the engine, and has a cushioning plate 28 and a pair of friction facings 29. The clutch disk 12 is fixedly coupled to the radially outer portion of the clutch plate 5 by rivets 10, which are fixedly coupled to the cushioning plate 28.

The output rotary member 20 is provided for transmitting a torque from the input rotary member 2 to the transmission, and is primarily formed of the spline hub 3 and the hub flange 8.

The spline hub 3, which is a cylindrical member made of steel, is disposed within the central apertures of the clutch and retaining plates 5 and 6, and is arranged coaxially with the central axis O—O. The inner periphery of the spline hub 3 is spline-engaged with the shaft (not shown) extending from the transmission. Thereby, the torque can be transmitted from the spline hub 3 to the transmission.

The hub flange 8 (first rotary member), which is an annular plate member made of steel and has a central aperture. The hub flange 8 is disposed radially outside the spline hub 3 and axially between the clutch and retaining plates 5 and 6. The radially inner portion of the hub flange 8 is elastically coupled in the rotating direction to the. spline hub 3 by coil springs 9. The hub flange 8 is provided at its radially middle portion with a plurality (four) of windows 21 (spring accommodating openings or apertures), which are formed in the positions corresponding to the spring support or accommodating portions 11 of the clutch and retaining plates 5 and 6 for accommodating the coil spring assemblies 13. Each window 21 is circumferentially long, and contact portions 24 are formed at the circumferentially opposite ends of the window 21.

The damper mechanism 4 is provided for elastically coupling the input and output rotary members 2 and 20 together in the rotating direction, and is primarily formed of the plurality of coil spring assemblies 13. Each coil spring assembly 13 is formed of a large coil spring 30, a small coil spring 31 and a pair of spring seats 64 arranged on the opposite sides of the small coil spring 31.

Figure 3:
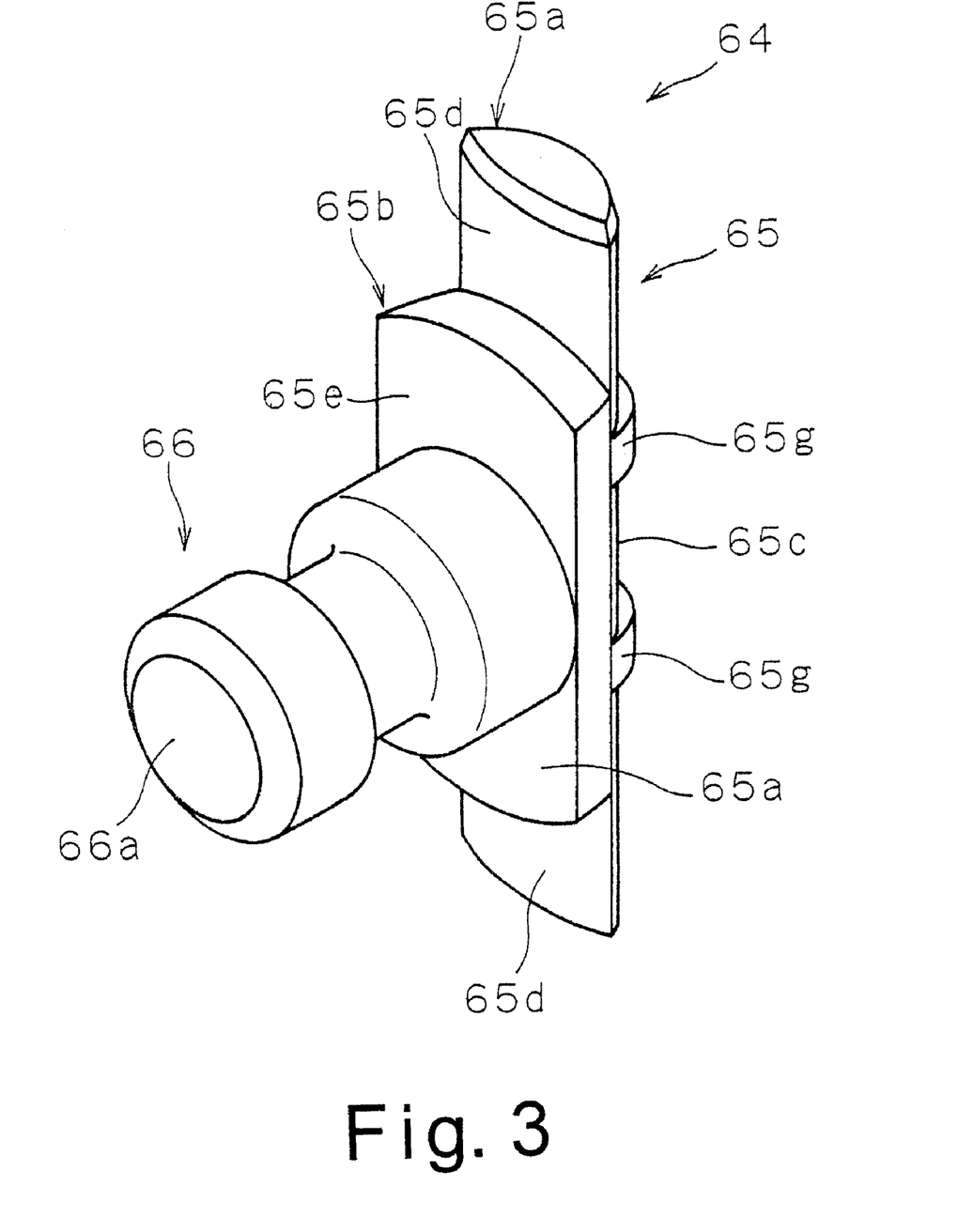
FIG. 3 is a side perspective view of a spring seat which is used in the clutch disk assembly illustrated in FIGS. 1 and 2 in accordance with a second embodiment of the present invention.
Figure 4:
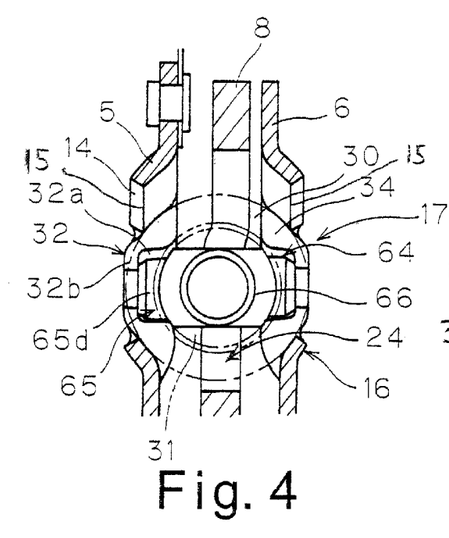
FIG. 4 is an enlarged schematic, fragmentary cross sectional view of part of the damper mechanism which shows the spring seat illustrated in FIG. 3 in elevation.
Figure 5:
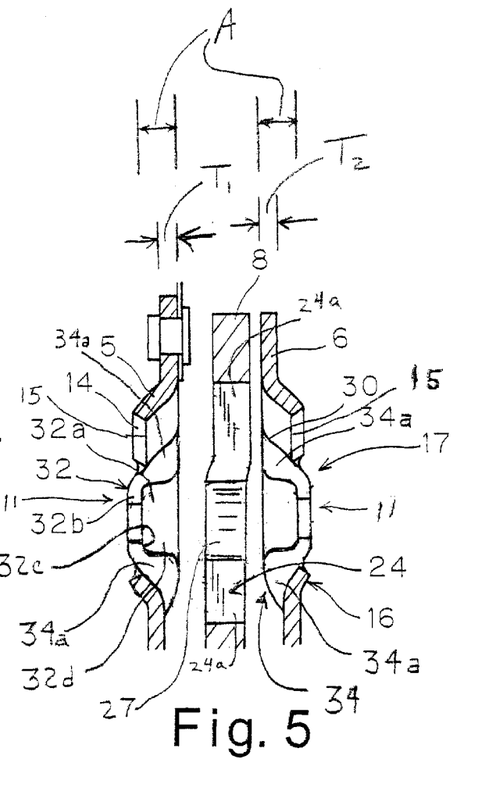
FIG. 5 is an enlarged schematic, fragmentary cross sectional view, similar to FIG. 4, showing a part of the damper mechanism.

Referring to FIGS. 3–5, description will now be given on the coil spring assembly 13 as well as the portions of the hub flange 8 and the clutch and retaining plates 5 and 6 supporting the coil spring assemblies 13. The large coil springs 30 are disposed within the windows 21, and have the circumferentially opposite ends in contact with the contact portions 24 of the hub flange 8, which will be described later. The small coil springs 31 (spring member) have a circumferential length, which are slightly smaller than that of the large coil springs 30, and have an outer diameters smaller than the inner diameters of the large coil springs 30. Thereby, the small coil springs 31 can be disposed within the large coil springs 30. A pair of spring seats 64 are arranged on the circumferentially opposite ends of each small coil spring 31. Thus, the small coil springs 31 are supported by the contact portions 24 of the windows 21 through the spring seats 64, respectively.

The spring seats 64 are provided for achieving parallel compression of the small coil spring 31 when torsional vibrations occur. The spring seat 64 is made of an elastic resin material such as a thermoplastic polyester elastomer, and has a support portion 65 and a projected portion 66 as shown in FIG. 3. Preferably, the spring seats 64 are each formed as a one-piece, unitary member.

The support portion 65 has an axially extended form. The support portion 65 is formed of an axially extended portion 65a and a spring support section 65b. The axially extended portion 65a has a first support surface 65c on the circumferentially outer side and an opposite surface 65d on the circumferentially inner side. The first support surface 65c has a smoothly curved section of a semicircular form with two projected portions or ribs 65g dividing the first support surface 65c into three sections. The center section of the first support surface 65c contacts the hub flange 8, while the end sections of the first support surface 65c contacts the clutch plate 5 and the retaining plate 6. Two projected portions 65g are axially spaced from each other. The projected portion 65g projects circumferentially outward from the first support surface 65c. The spring support section portion 65b is formed in the axially middle portion of the surface 65d of the axially extended portion 65a. A second support surface 65e, which is the circumferentially inner surface of the spring support section 65b, is a flat surface surrounding the projected portion 66, and is located circumferentially inside the surface 65d.

The second support surface 65e has an axial length from the projected portion 66, which is substantially equal to the outer diameter of the small coil spring 31. Thereby, the spring support section 65b can be in contact with the small coil spring 31 for circumferentially supporting it, and can be inserted into the large coil spring 30. In other words, the large coil spring 30 surrounds the spring support section 65b.

The projected portion 66 projects circumferentially inward from the axially middle portion of the spring support section 65b. Since the projected portion 66 has the outer diameter slightly smaller than the inner diameter of the small coil spring 31, and it can be inserted into the circumferential end of the small coil spring 31. The projected portion 66 is provided at its end portion with a contact surface 66a which can come into contact with the contact surface 66a of the neighboring spring seat 64. Thereby, the contact surfaces 66a of the paired spring seats 64 can come into contact with each other to produce a stop torque when the small coil spring 31 is compressed.

Figure 6:
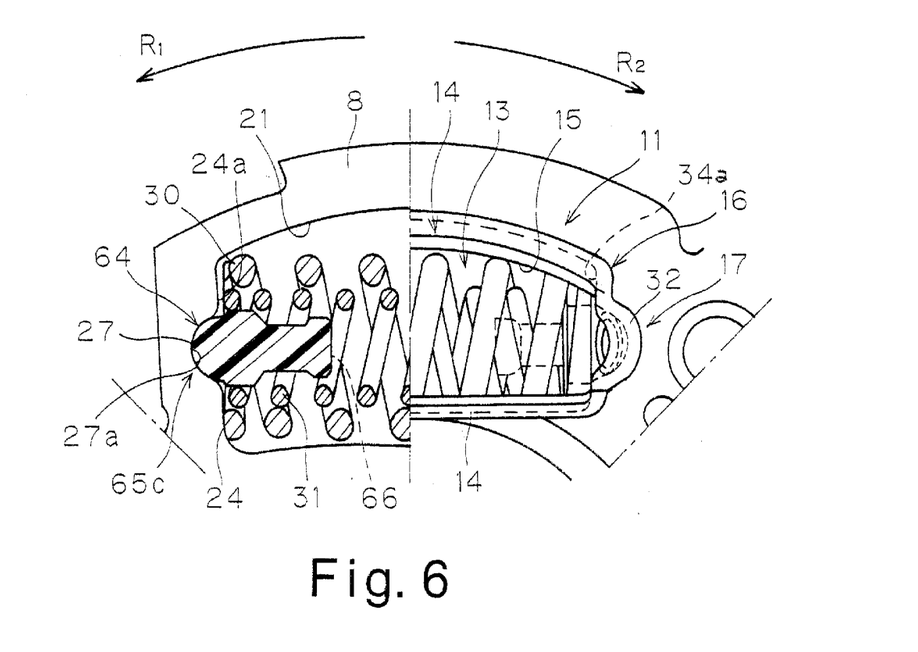
FIG. 6 is an enlarged schematic, fragmentary elevational view of part of the damper mechanism illustrated in FIG. 2 with a portion broken away to illustrate the spring seat illustrated in FIG. 3.

The contact portion 24 of the window 21 of the hub flange 8 has an edge surface 24a, which extends straight. The edge surface 24a can come into direct contact with the end surface of the large coil spring 30 such that the surface 65d of the spring seat 64 does not contact the large coil spring 30. The edge surface 24a is provided at its radially middle portion with a recess 27 forming the circumferential end of the spring accommodating opening or aperture of window 21. The recess 27 has a substantially semicircular form which is complementary in shape to the first support surface 65c of the spring seat 64. Thereby, the support portion 65 of the spring seat 64 can be radially unmovably engaged with the recess 27. When the support portion 65 is engaged with the recess 27, the first support surfaces 65c of the support portion 65 extends in an axial direction that is substantially perpendicular to the edge surface 24a of the contact portion 24 of the window 21. Therefore, the circumferentially opposite ends of the large coil spring 30 can come into direct contact with the contact portions 24 without coming into contact with the spring seats 64, respectively, as seen in FIG. 6.

The clutch and retaining plates 5 and 6 are provided with the spring accommodating portions 11 located in the positions corresponding to the windows 21. The spring accommodating portion 11 has a through-aperture 15 axially extending through the clutch or retaining plate 5 or 6, and also has a raised portion 16 which is bent and projected axially outward by drawing from the entire periphery of the through-aperture 15.

Each of the raised portions 16 has upper and lower cover portions 14 and a pair of spring support portions 17 at the circumferential ends of the cover portions 14. The cover portions 14 are projected obliquely from the main body of the plate on each of the radially opposite sides of the through-aperture 15, and can restrict the radial and axial movement of the coil spring assembly 13.

The spring support portions 17 (the circumferentially opposite ends of the spring accommodating portion) are configured to support the circumferentially opposite ends of the coil spring assembly 13, and are formed on the circumferentially opposite ends of the through-aperture 15. The spring support portions 17 are bent and raised by a drawing or stamping process so as to extend substantially perpendicularly from the main body of the plate material. Each of the spring support portions 17 is formed of two contact portions 34 in the radially inner and outer positions and a spring seat receiving portion 32 in the radially middle portion. The contact portions 34 receive the load of the large coil springs 30, while the spring seat receiving portions 32 receive the load of the small coil springs 31. Each contact portion 34 has a contact surface 34a facing inward in the circumferential direction of the spring accommodating portion 11. The contact surface 34a is a substantially flat surface for supporting one of the circumferential ends of one of the large coil springs 30 by engagement. The contact surface 34a extends in the axial direction with axial lengths that are longer than the predetermined thicknesses of the clutch plate 5 and the retaining plate 6.

The spring seat receiving portion 32 has a surrounding form as shown in FIGS. 4 and 5, and can surround the radially, circumferentially and axially outer ends of one of the spring seats 64. The spring seat receiving portions 32 are provided at positions corresponding to the recesses 27 of the window 21, respectively. Each spring seat receiving portion 32 is recessed relative to contact portions 34. The recess of each receiving portion 32 is formed of a pressure receiving portion 32a (first wall) for receiving the load applied from the spring seat 64, and a restricting portion 32b (second wall) for restricting the axial movement of the spring seat 64.

The pressure receiving portion 32a is formed of a curved wall portion which extends axially from the plate portion, and extends continuously between the two contact portions 34. The pressure receiving portion 32a has an axial length A that is larger than the thicknesses $T_1$ and $T_2$ of each of the plates 5 and 6, respectively. The pressure receiving portion 32a is complementary in shape to the first support surface 65c so that it can be in contact with a predetermined end region of the first support surface 65c of the spring seat 64. More specifically, the inner contact surface 32d (first contact surface) of the pressure receiving portion 32a extends substantially straight in the axial direction, and has a smoothly concaved section of a semicircular form corresponding to the section of the first support surface 65c. Thereby, the pressure receiving portion 32a can receive the load applied from the spring seat 64 through an area larger than a conventional structure (i.e., an area larger than the sectional area of the plate) so that the surface pressure between the spring seat 64 and the pressure receiving portion 32a can be reduced. The restricting portion 32b (second wall) is formed at an axial end of the pressure receiving portion 32a and has an arc-shaped outer surface as seen in FIG. 6. The restricting portion 32b is provided at its axially inner side with a flat surface 32c (second contact surface).

When the clutch disk assembly 1 is not supplied with a torque, and thus is in the free state, the spring seat 64 and the spring seat receiving portion 32 are engaged with each other as will be described below. The axially opposite ends of the support portion 65 of the spring seat 64 are supported by the spring seat receiving portions 32. More specifically, the axially opposite ends of the first support surface 65c are in contact with the inner surfaces 32d of the pressure receiving portions 32a. The axially opposite end surfaces of the axially extended portion 65a are located close to the surfaces 32c of the restricting portions 32b. In this state, the spring seat 64 is unmovable with respect to the spring seat receiving portion 32 in the axially opposite directions, radially opposite directions and circumferentially outward direction. However, the spring seat 64 can smoothly move circumferentially inward and thus away from the spring seat receiving portion 32, and can smoothly return to the position for contacting with the spring seat receiving portion 32. The spring seat 64 that is engaged with the spring seat receiving portion 32 can turn around on an axis extending in the axial direction.

When the clutch disk assembly 1 is not supplied with the torque, and thus is in the free state, the spring seat 64 is engaged with the recess 27 as will be described below. The axially middle portion of the support portion 65 of the spring seat 64 is supported by the recess 27. More specifically, the axially middle section (between the two projected portions 65g) of the first support surface 65c of the axially extended portion 65a is in contact with the edge surface 27a of the recess 27. The two projected portions 65g are located on the axially opposite sides of the portion surrounding the recess 27. In this state, the spring seat 64 is unmovably engaged with the recess 27 in the axially opposite directions, radially opposite directions and the circumferentially outward direction. However, the spring seat 64 can smoothly move circumferentially inward and thus away from the recess 27, and can smoothly return to a position for contact with the edge of the recess 27. The spring seat 64 that is engaged with the recess 27 can rotate around an axis extending in the axial direction.

The operation of the clutch disk assembly 1 will now be described. When the clutch is engaged by pressing the clutch disk 12 to the friction surface of the flywheel, the torque of the engine is transmitted to the input rotary member 2, and is transmitted through the coil spring assemblies 13 to the output rotary member 20 and finally to the shaft extending from the transmission. In this operation, the large and small coil springs 30 and 31 are compressed in the rotating direction between the contact portion 24 of the window 21 and the spring seat receiving portion 32 of the spring support portion 11. Thereby, the clutch and retaining plates 5 and 6 rotate relatively to the hub flange 8. When the large and small coil springs 30 and 31 are compressed to a large extent, the contact surfaces 66a of the paired spring seats 64 come into contact with each other. Thereby, the clutch and retaining plates 5 and 6 no longer rotate relatively to the hub flange 8, and the paired spring seats 64 generate a stop torque in the rotating direction.

An operation of the coil spring assembly 13 will now be described. It is now assumed that the hub flange 8 is twisted in the rotating direction $R_2$ relatively to the plates 5 and 6 from the neutral position shown in FIG. 6. Thereby, the coil spring assembly 13 is compressed between the contact portion 24 on the $R_1$ side and the portions on the $R_2$ side, i.e., the contact portion 34 and the spring seat receiving portion 32. The coil spring 30 is compressed between the edge surface 24a of the contact portion 24 on the $R_1$ side and the contact surface 34a of the contact portion 34. The spring seat 64 supporting the small coil spring 31 is supported by the edge surface 27a of the recess 27 on the $R_1$. side and the inner surface 32d of the spring seat receiving portion 32 on the $R_2$ side. The spring seat 64 on the $R_1$ side rotates along the recess 27, and the spring seat 64 on the $R_2$ side rotates along the inner surface 32d of the pressure receiving portion 32a. Thereby, the parallel compression of the small coil spring 31 can be performed.

Since the spring seat 64 on the $R_1$ side has the two projected portions 65g located on the axially opposite sides of the recess 27, the axial movement thereof relative to the hub flange 8 is restricted. Since the spring seat 64 on the $R_2$ side is arranged such that the restricting portions 32b of the clutch and retaining plates 5 and 6 are located axially outside the axially extended portion 65a of the support portion 65, the axial movement thereof to the plates 5 and 6 is restricted. As described above, the axial movement and thus rattling of the spring seat 64 are suppressed by the circumferentially opposite portions. This results in the restriction of the axial position of the circumferentially opposite ends of the small coil spring 31.

In the above operations, the pressure receiving portion 32a can receive the load from the spring seat 64 through a larger area than the conventional structure. Therefore, the surface pressure between the spring seat 64 and the support portions of the plates 5 and 6 can be reduced. As a result, wearing and breakage of the spring seat 64 can be suppressed during rotation of the clutch disk assembly 1.

The terms of degree such as "substantially", "about" and "approximately" as used herein mean a reasonable amount of deviation of the modified term such that the end result is not significantly changed. These terms should be construed as including a deviation of at least±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Thus, the structure of the damper disk assembly according to the present invention is not restricted to that of the embodiment already described and illustrated. For example, the invention may employ a structure in which the hub flange is integral with the spline hub. The damper disk assembly according to the invention is not restricted to the clutch disk assembly, and can be applied to damper mechanisms of a flywheel assembly and a torque converter lock-up device. In addition, the spring seat may have a configuration other than that of the embodiment already described. According to the present invention, since the surface pressure between the spring seat and the support portion of the plate can be reduced during operation of the clutch, the wearing and breakage of the spring seat can be suppressed. Accordingly, the foregoing description of the embodiments according to the present invention are provided for illustration only, and not for the purpose of limiting the invention as defined by the appended claims and their equivalents.

What is claimed is:

1. A damper disk assembly comprising:

a first rotary member provided with at least one spring accommodating aperture;

a pair of second rotary members disposed on axially opposite sides of said first rotary member, said pair of second rotary members being fixed to each other with a predetermined axial space therebetween, said pair of second rotary members being constructed from a plate material having a predetermined thickness and at least one spring accommodating portion located in a position that corresponds to said spring accommodating aperture;

a spring member disposed in said spring accommodating aperture and said spring accommodating portions to transmit a torque between said first rotary member and said pair of second rotary members; and a pair of spring seats being arranged on circumferentially opposite ends of said spring member, said spring seats extending in the axial direction with support portions that support circumferentially opposite ends of said spring member and are supported by circumferentially opposite ends of said spring accommodating aperture and said spring accommodating portions, each of said spring accommodating portions being provided at each of its circumferentially opposite ends with a first contact surface extending in the axial direction, said first contact surfaces having axial lengths which are longer than said predetermined thicknesses of said plate material of said second rotary members to contact with said support portions of said spring seats, and each of said spring accommodating portions being provided at each of its circumferentially opposite ends with a second contact surface being arranged to restrict axial movement of said spring seats.

2. The damper disk assembly according to claim 1, wherein said spring member includes an outer coil spring being located around an inner coil spring.

3. The damper disk assembly according to claim 2, wherein each of said circumferentially opposite ends of said spring accommodating portions further includes a spring contact surface that is engageable with one of said outer coil springs to support circumferentially opposite ends of one of said outer coil springs, each of said spring contact surfaces extending in the axial direction with axial lengths that are longer than said predetermined thicknesses of said second rotary members.

4. The damper disk assembly according to claim 3, wherein each of said spring contact surfaces is partially located radially above and below a corresponding one of said first contact surfaces.

5. The damper disk assembly according to claim 1, wherein
said first rotary member has a plurality of said spring accommodating apertures; and
each of said second rotary members has a plurality of said spring accommodating portions corresponding to said spring accommodating apertures with a plurality of said spring members being arranged within said plurality of said spring accommodating apertures and said plurality of said spring accommodating portions, respectively, and a plurality of said spring seats being arranged on circumferentially opposite ends of said spring members.

6. The damper disk assembly according to claim 5, wherein
each of said spring accommodating portions is further provided at each of its circumferentially opposite ends with a second contact surface that is arranged to restrict axial movement of said spring seats.

7. The damper disk assembly according to claim 5, wherein
each of said first contact surfaces has an arc-shaped concave portion facing in the circumferential direction, and
each of said support portions of said spring seats has a support surface engageable with said concave portions of said first contact surfaces.

8. The damper disk assembly according to claim 7, wherein
each of said circumferentially opposite ends of said spring accommodating apertures has an arc-shaped concave surface that contacts a corresponding one of said support surfaces of said support portions.

9. The damper disk assembly according to claim 5, wherein
each of said spring members include an outer coil spring being located around an inner coil spring.

10. The damper disk assembly according to claim 9, wherein
each of said circumferentially opposite ends of said spring accommodating portions further includes a spring contact surface that is engageable with one of said outer coil springs to support the circumferentially opposite ends of one of said outer coil springs, each of said spring contact surfaces extending in the axial direction with axial lengths that are longer than said predetermined thicknesses of said second rotary members.

11. The damper disk assembly according to claim 10, wherein
each of said spring contact surfaces is partially located radially above and below a corresponding one of said first contact surfaces.

12. A damper disk assembly comprising:
a first rotary member provided with at least one spring accommodating aperture;
a pair of second rotary members disposed on axially opposite sides of said first rotary member, said pair of second rotary members being fixed to each other with a predetermined axial space therebetween, said pair of second rotary members being constructed from a plate material having a predetermined thickness and at least one spring accommodating portion located in a position that corresponds to said spring accommodating aperture;
a spring member disposed in said spring accommodating aperture and said spring accommodating portions to transmit a torque between said first rotary member and said pair of second rotary members; and
a pair of spring seats being arranged on circumferentially opposite ends of said spring member, said spring seats extending in the axial direction with support portions that support circumferentially opposite ends of said spring member and are supported by circumferentially opposite ends of said spring accommodating aperture and said spring accommodating portions,
each of said spring accommodating portions being provided at each of its circumferentially opposite ends with a first contact surface extending in the axial direction, said first contact surfaces having axial lengths which are longer than said predetermined thicknesses of said plate material of said second rotary members to contact with said support portions of said spring seats,
each of said first contact surfaces having an arc-shaped concave portion facing in the circumferential direction, and
each of said support portions of said spring seats having a support surface engageable with said concave portions of said first contact surfaces.

13. The damper disk assembly according to claim 12, wherein
each of said circumferentially opposite ends of said spring accommodating apertures has an arc-shaped concave surface that contacts a corresponding one of said support surfaces of said support portions.

14. A damper disk assembly comprising:
a first rotary member provided with at least one spring accommodating aperture;
a pair of second rotary members disposed on axially opposite sides of said first rotary member, said pair of second rotary members being fixed to each other with a predetermined axial space therebetween, said pair of second rotary members having at least one spring accommodating portion located in a position that corresponds to said spring accommodating aperture;
a spring member disposed in said spring accommodating aperture and said spring accommodating portions to transmit torque between said first rotary member and said pair of second rotary members; and
a pair of spring seats being arranged on circumferentially opposite ends of said spring member, said spring seats extending in the axial direction and having support portions that support circumferentially opposite ends of said spring member and are supported by circumferentially opposite ends of said spring accommodating aperture and said spring accommodating portions, said support portions having radially opposite sides extending in a radial direction relative to said pair of second rotary members,
each of said spring accommodation portions being shaped by drawing to extend in an axial direction to form at each of its circumferentially opposite ends a first wall which supports a circumferentially outer side and said radially opposite sides of said support portions of said spring seat.

15. The damper disk assembly according to claim 14, wherein
said first rotary member has a plurality of said spring accommodating apertures; and each of said second rotary members has a plurality of said spring accommodating portions corresponding to said spring accommodating apertures with a plurality of said spring members being arranged within said plurality of said spring accommodating apertures and said plurality of said spring accommodating portions, respectively, and a plurality of said spring seats being arranged on circumferentially opposite ends of said spring members.

16. The damper disk assembly according to claim 14, wherein each of said first walls has an arc-shaped concave portion facing in the circumferential direction, and each of said support portions of said spring seats has a support surface engageable with said concave portions of said first contact walls.

17. The damper disk assembly according to claim 16, wherein each of said circumferentially opposite ends of said spring accommodating apertures has an arc-shaped concave surface that contacts a corresponding one of said support surfaces of said support portions.

18. The damper disk assembly according to claim 14, wherein said spring member includes an outer coil spring being located around an inner coil spring.

19. A damper disk assembly comprising:

a first rotary member provided with at least one spring accommodating aperture;

a pair of second rotary members disposed on axially opposite sides of said first rotary member, said pair of second rotary members being fixed to each other with a predetermined axial space therebetween, said pair of second rotary members having at least one spring accommodating portion located in a position that corresponds to said spring accommodating aperture;

a spring member disposed in said spring accommodating aperture and said spring accommodating portions to transmit torque between said first rotary member and said pair of second rotary members; and a pair of spring seats being arranged on circumferentially opposite ends of said spring member, said spring seats extending in an axial direction and having support portions that support circumferentially opposite ends of said spring member and are supported by circumferentially opposite ends of said spring accommodating aperture and said spring accommodating portions, each of said spring accommodation portions being shaped by drawing to extend in the axial direction to form at each of its circumferentially opposite ends a first wall which supports a circumferentially outer side and radially opposite sides of said support portions of said spring seat, each of said spring accommodating portions being provided at each of its circumferentially opposite ends with a second wall being formed on an axially outer end of said first wall to support an axial side of said support portion of said spring seat.

20. A damper disk assembly comprising:

a first rotary member provided with at least one spring accommodating aperture;

a pair of second rotary members disposed on axially opposite sides of said first rotary member, said pair of second rotary members being fixed to each other with a predetermined axial space therebetween, said pair of second rotary members having at least one spring accommodating portion located in a position that corresponds to said spring accommodating aperture;

a spring member disposed in said spring accommodating aperture and said spring accommodating portions to transmit torque between said first rotary member and said pair of second rotary members, said spring member including an outer coil spring being located around an inner coil spring; and a pair of spring seats being arranged on circumferentially opposite ends of said spring member, said spring seats extending in an axial direction and having support portions that support circumferentially opposite ends of said spring member and are supported by circumferentially opposite ends of said spring accommodating aperture and said spring accommodating portions, each of said spring accommodation portions being shaped by drawing to extend in the axial direction to form at each of its circumferentially opposite ends a first wall which supports a circumferentiaUy outer side and radially opposite sides of said support portions of said spring seat, each of said circumferentially opposite ends of said spring accommodating portions further including a spring contact surface being engageable with one of said outer coil springs to support circumferentially opposite ends of one of said outer coil springs, each of said spring contact surfaces extending in the axial direction with axial lengths that are longer than said predetermined thicknesses of said second rotary members.

21. The damper disk assembly according to claim 20, wherein each of said spring contact surfaces is partially located radially above and below a corresponding one of said first walls.

* * * * *